United States Patent [19]
Durkin et al.

[11] Patent Number: 5,856,996
[45] Date of Patent: Jan. 5, 1999

[54] COMPACT EFFICIENT SOLID STATE LASER

[75] Inventors: Peter S. Durkin, Albuquerque, N. Mex.; Peter Peuser, Forschung, Germany

[73] Assignee: The United States of America as represented by the Secretary of the Air Force, Washington, D.C.

[21] Appl. No.: 226,786

[22] Filed: Apr. 12, 1994

Related U.S. Application Data

[63] Continuation-in-part of Ser. No. 986,420, Dec. 7, 1992, abandoned.

[51] Int. Cl.$^6$ .................................................... H01S 3/08
[52] U.S. Cl. ..................... 372/98; 372/21; 372/22; 372/23; 372/41; 372/70; 372/92; 372/97; 372/94
[58] Field of Search ............................. 372/21, 22, 23, 372/39, 40, 41, 43, 50, 70, 92, 93, 94, 97, 98, 100

[56] References Cited

U.S. PATENT DOCUMENTS

| | | | |
|---|---|---|---|
| 4,173,001 | 10/1979 | Koepf | 372/92 X |
| 4,989,216 | 1/1991 | Chandra et al. | 372/97 |
| 5,117,126 | 5/1992 | Geiger | 372/22 X |
| 5,251,229 | 10/1993 | Bennett, Jr. et al. | 372/92 |
| 5,307,369 | 4/1994 | Kimberlin | 372/108 |

*Primary Examiner*—Brian Healy
*Attorney, Agent, or Firm*—Thomas C. Stover

[57] ABSTRACT

The invention provides a compactly built solid state laser, which can be pumped by high power semiconductor laser diodes and uses two or more laser crystals as the laser gain or amplification media, which crystals can also contain the resonator mirrors. As desired per the invention, linear, monolithic folded or ring-shaped laser resonators can be formed to provide very efficient production of frequency doubled laser radiation.

25 Claims, 3 Drawing Sheets

COMPACT EFFICIENT SOLID STATE LASER

RELATED APPLICATIONS

This application is a Continuation-in Part of application Ser. No. 07/986,420 filed 7 Dec., 1992, now abandoned.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a compactly constructed solid-state laser, particularly one that is efficient and of high power.

2. The Prior Art

Solid state lasers are known. See for example in the publication "Laser 89" (New Orleans), the Article entitled "CW-Frequency-Doubled Nd: YAG Laser with High Efficiency" by W. Rupp and P. Greve. The development and manufacture of high-power semiconductor laser diodes has made possible the design of compact, high-power and efficient solid-state lasers, wherein the laser diode is used as the pump light source of the solid-state laser. The spatial beam properties of the solid-state laser, e.g. divergence and beam profile are improved considerably over laser diodes. Laser diodes are used for the excitation of the solid-state laser, where in an optic-to-optic conversion efficiency η of more than 40% can be attained. Since the emission wavelength of the laser diode can be tuned exactly to the absorption maximum of the solid-state crystal, the thermal loading of the laser crystal is reduced significantly in comparison to lamp pumps. For example, a lamp-pumped solid-state delivers as much as 40 W infrared light in CW operation or 14 W green light in multimode CW-operation, as indicated from the above-cited publication.

However, the total degree of efficiency of the above type of system is quite low. Several kilowatts of input power are required to create a few Watts of output power. Moreover, the system components, such as pump lamps, high voltage power supply, coolant system necessary for the pump lamps and laser crystal(s), are bulky. In addition, there is the disadvantage of a short life expectancy for the pump lamps.

The resonator of a diode-pumped solid-state laser normally has a linear, folded semi-monolithic, or ring-shaped design. One refers to a semi-monolithic design when a mirror, generally the input mirror, is formed directly on a laser rod crystal. The separate output mirror is provided with an optical coating, which has a transmission of a few percent for the fundamental wavelength.

In order to focus the semiconductor laser diode light in the laser crystal a lens system must be used. This lens system is optimized such that the overlapping of the pump light with the $TEM_{00}$-resonator mode in the laser crystal guarantees an efficient basic-mode operation. Thus the pump light should be imaged to the greatest extent possible within the resonator-mode space.

To double the fundamental frequency of the laser, up to now it has been necessary to employ an additional non-linear crystal, for example, a KTP crystal, in the resonator. A solid-state laser can be pumped by a diode laser either longitudinally or transversely. Transversely pumped systems generally exhibit a low degree of efficiency due to the unsuitable overlapping of $TEM_{00}$ mode-and pump-volumes.

Most solid-state lasers use a single laser diode to end-pump the laser crystal. A few systems have been developed, which make it possible to couple more pump light in the laser crystal. In one such linearly-designed system, an Nd:YAG crystal is pumped from both sides by two GaA1As laser diodes, as has been shown in "Solid-State Laser Engineering" by W. Koechner, page 316, Springer Press, New York (1988). The crystal is located in the middle of the resonator between two mirrors. An outcouple mirror, external to the resonator, is required to outcouple the laser light which, however, makes it difficult to couple the pump light into the crystal efficiently.

A further possibility to pump a laser resonator longitudinally with several laser diodes, is yielded by polarization coupling of two laser diodes, as recommended in the Article "End-pumped Nd:BEL Laser Performance" by R. Scheps, J. Myers, E. K. Schimitschek, and D. F. Heller in "Optical Engineering 27" (1988), p. 830. In this case, however, the use of a beam-splitter cube leads to pump light losses of about 30%. As an alternative, the state of technology in fiber coupling recommends itself. Here the pump light of several laser diodes is coupled to the laser crystal longitudinally via fibers. However, this solution also exhibits considerable (light) losses.

The present invention overcomes the above shortcomings by providing a solid state laser system of improved efficiency and of reduced size, wherein multiple configurations and pulse operation, are possible and birefringent effects, through heat losses, are eliminated.

SUMMARY OF THE INVENTION

Broadly the present invention provides a compact solid-state laser system having a resonator which is formed linearly, folded or ring-shaped. The resonator includes, a) at least two laser crystals, b) means optically associated with each of said crystals to pump the crystals to generate a laser beam therebetween and c) partially reflective means mounted optically between at least a pair of the crystals, for outcoupling a portion of the laser beam generated by the crystals and for resonating the remainder of the beam between such crystals.

In one embodiment of the invention, laser rod crystals are employed with a pivotable outcoupling mirror.

Glossary of Abbreviations/Acronyms Used:

AR anti-reflecting
CW continuous wave
FF fundamental frequency
HR highly reflecting
HT highly transmitting
KTP frequency doubling non-linear crystal
QWP quarter-wave plate
SH second harmonic
SHG second harmonic generator such as KTP
$TEM_{00}$ lowest order resonator mode

BRIEF DESCRIPTION OF THE DRAWINGS

The invention will become more apparent from the following detailed specification and drawings in which.

DESCRIPTION OF PREFERRED EMBODIMENTS

Figure 1:
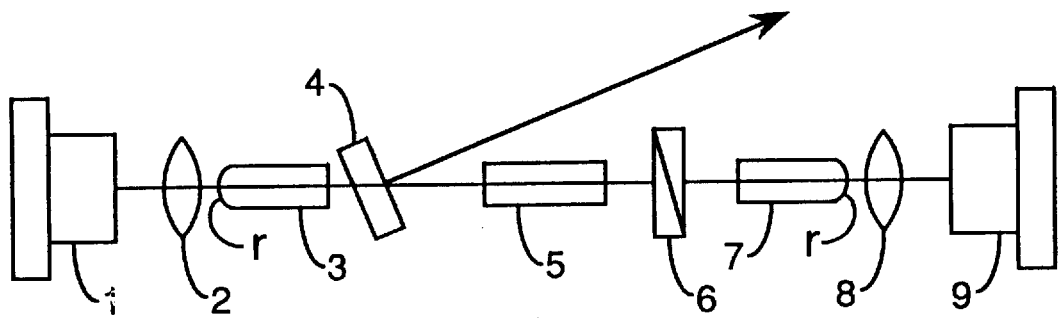
FIG. 1 is a schematic diagram of a linear resonator with a non-linear SHG crystal embodying the invention.

Referring in more detail to the drawings, FIG. 1 displays a linearly arranged frequency-doubled, solid-state laser, in which two rare earth doped laser rod crystals 3 and 7 are installed in the laser resonator as gain or amplification media and resonator mirror. Crystal 3, 7, as appropriate for the arrangement, posses a suitable curvature radius r, and are coated to be highly reflecting (HR) for the fundamental frequency (FF) on the pump light input coupling side, and on the opposite side, anti-reflecting (AR). This implementation example of a solid-state laser has two high-power semiconductor laser diodes 1 and 9 to simultaneously end-pump the crystals 3, 7 from both sides of the resonator to attain CW operation. The optics 2, 8 for input coupling of the pump light are shown in simplified form in the drawing. A non-linear SHG crystal 5 used to double the fundamental frequency, is located approximately in the middle of the resonator. The laser crystal 7, is additionally coated HR on its front surface for reflection of the second harmonic (SH) in the resonator. As an alternative, a mirror which is highly reflecting (HR) for the SH, can be installed in the resonator, whereby however, additional power losses will occur. A slightly inclined mirror 4, which is AR coated for the fundamental frequency and HR coated for the SH frequency is positioned in the resonator to outcouple the SH. A $\lambda/4$-plate (QWP)6 is located in the resonator to prevent the so-called "green problem."

Figure 2:
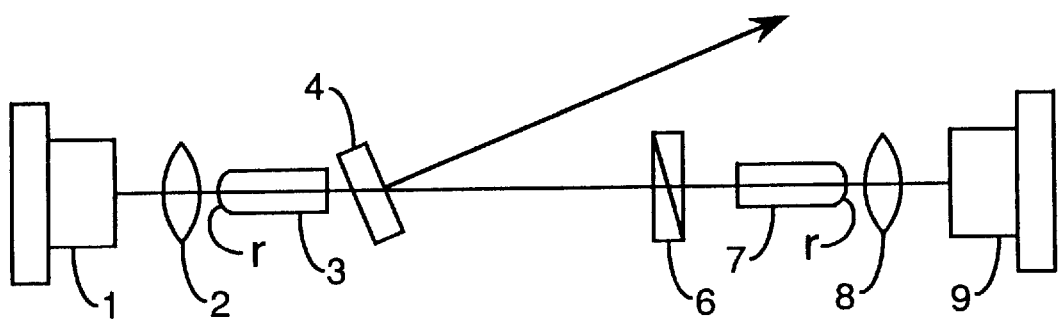
FIG. 2 is a schematic diagram per FIG. 1 but without the SHG crystal.

FIG. 2 shows a linearly designed solid-state laser such as shown in FIG. 1, but without the non-linear SHG crystal. In this form of implementation, the two crystals 3, 7 are coated (for the FF) HR on the pump light input coupling side and AR on the opposite side. The outcouple mirror 4 is coated on one side to be transmitting for the FF and on the second side, AR.

Figure 3:
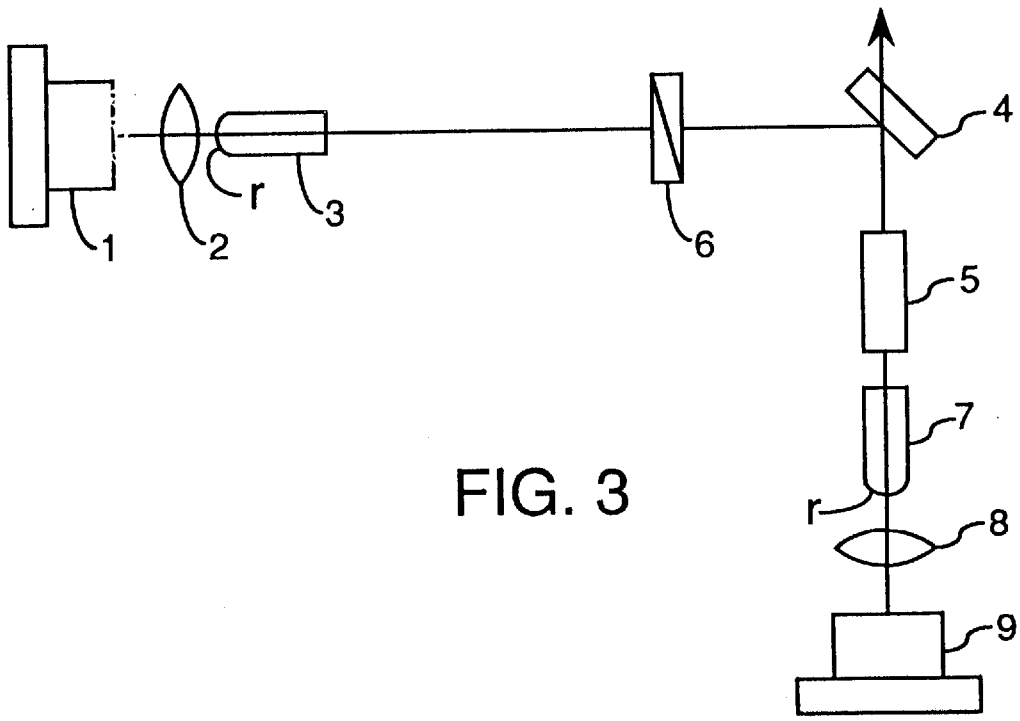
FIG. 3 is a schematic diagram of a folded resonator with an SHG crystal embodying the invention.

An example of the layout for a folded resonator form is shown in FIG. 3. In this folded configuration, two laser rod crystals 3, 7 are installed as amplification media and resonator mirrors. These crystals have a suitable curvature radius r, as mentioned above, and are coated (for the FF) on the pump light input coupling side, HR and on the opposite side, AR. The solid-state laser resonator again has two high-power semiconductor laser diodes 1, 9, which pump crystals 3, 7 simultaneously from both sides of the resonator. The laser resonator also has optics 2 and 8 for input coupling of the pump light. A non-linear SHG crystal 5 for doubling the fundamental frequency, is located in the folded portion of the laser resonator. To outcouple the harmonic SH from the folded resonator, a mirror 4 which is coated HR for the FF and HT for the SH is employed. To reflect the SH back through the resonator to the outcoupling mirror 4, laser crystal 7 is coated as described above, and a QWP installed.

Figure 4:
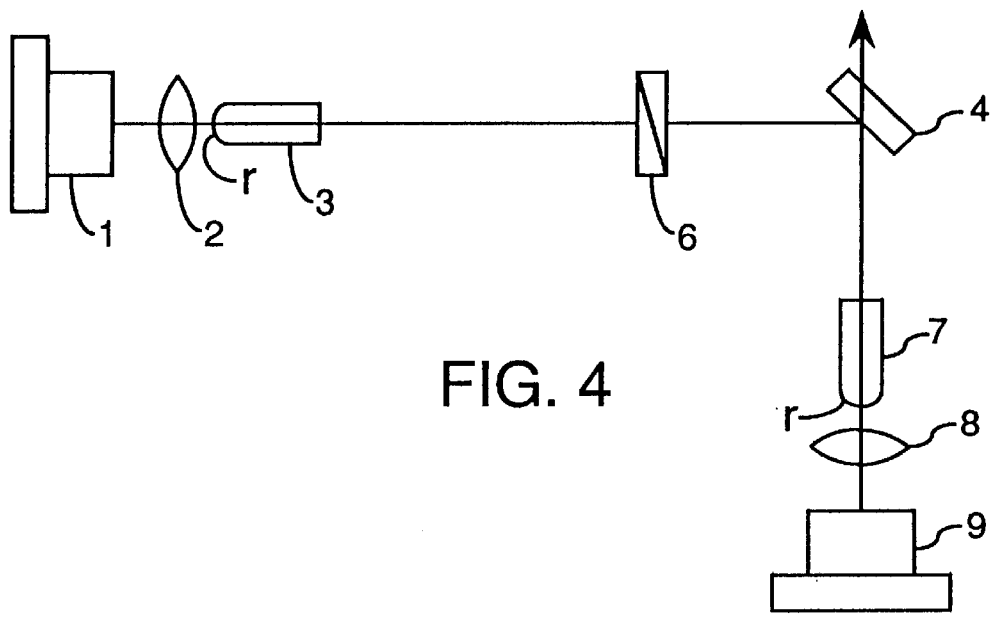
FIG. 4 is a schematic diagram per FIG. 3 but without the SHG crystal.

In FIG. 4 is shown essentially the same laser system as in FIG. 3 but without the (non-linear) SHG crystal. In this case both crystals 3, 7 are coated for the fundamental frequency HR on the input coupling side and AR on the opposite side. The outcoupling mirror 4 has a transmission of a few percent for the fundamental frequency. By "few percent" as used herein, is meant 1–15% and preferably 2–10% for CW operation and 1–50% for pulsed operation, depending upon, eg. the input power and configuration of the resonator embodiment of the invention.

Figure 5:
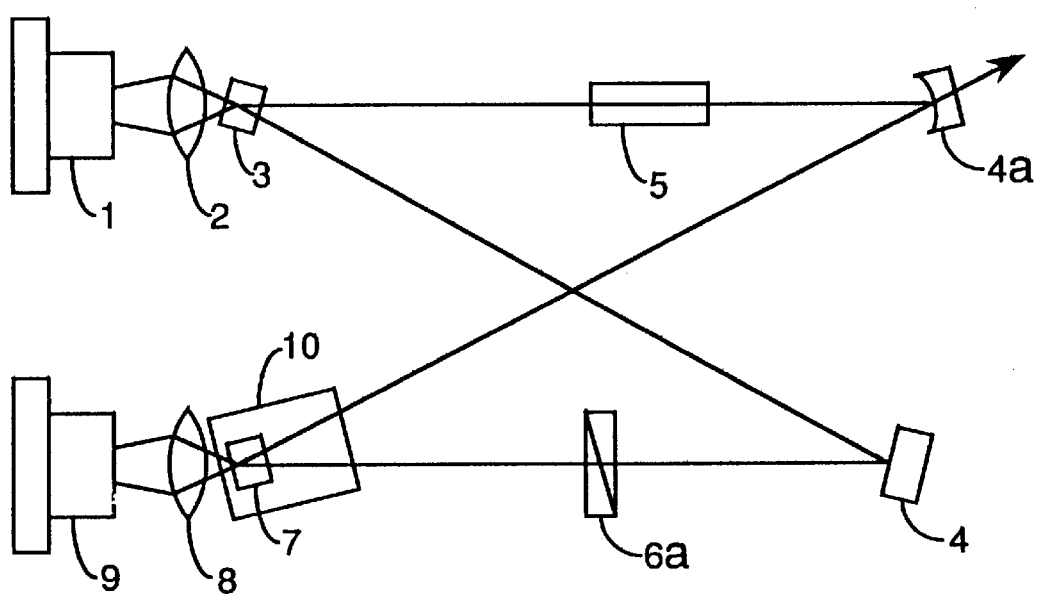
FIG. 5 is a schematic diagram of a ring resonator with an SHG crystal embodying the invention.

FIG. 5 shows a design example for a ring-shaped resonator. Here two laser rod crystals 3, 7 are employed together with two mirrors 4, 4a. These crystals are coated for the FF, HR on the pump light input coupling side and AR on the opposite side. The two mirrors are coated to be HR for the FF. Mirror 4a is additionally coated to be HT for the SH, so as to outcouple the single-frequency light. This design form also consists of two high-power semiconductor laser diodes 1 and 9, coupling optics 2 and 8, and non-linear SHG crystal 5. Further, there are a Faraday cell 10 and a $\lambda/2$-plate 6a located in the resonator, so as to allow the light or laser beam to travel in only one direction.

Figure 6:
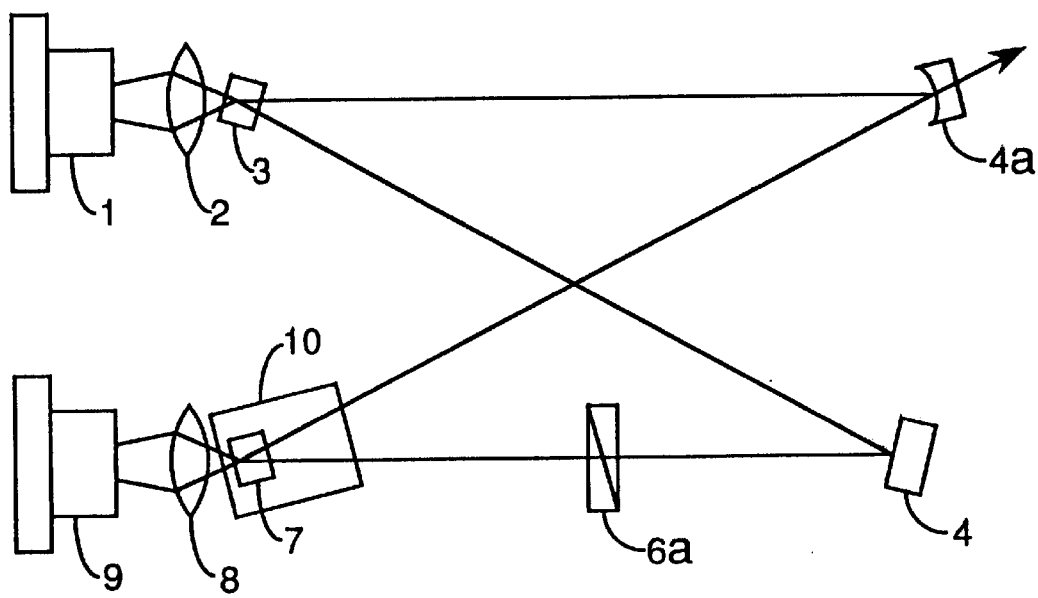
FIG. 6 is a schematic diagram per FIG. 5 but without the SHG crystal.
Figure 7:
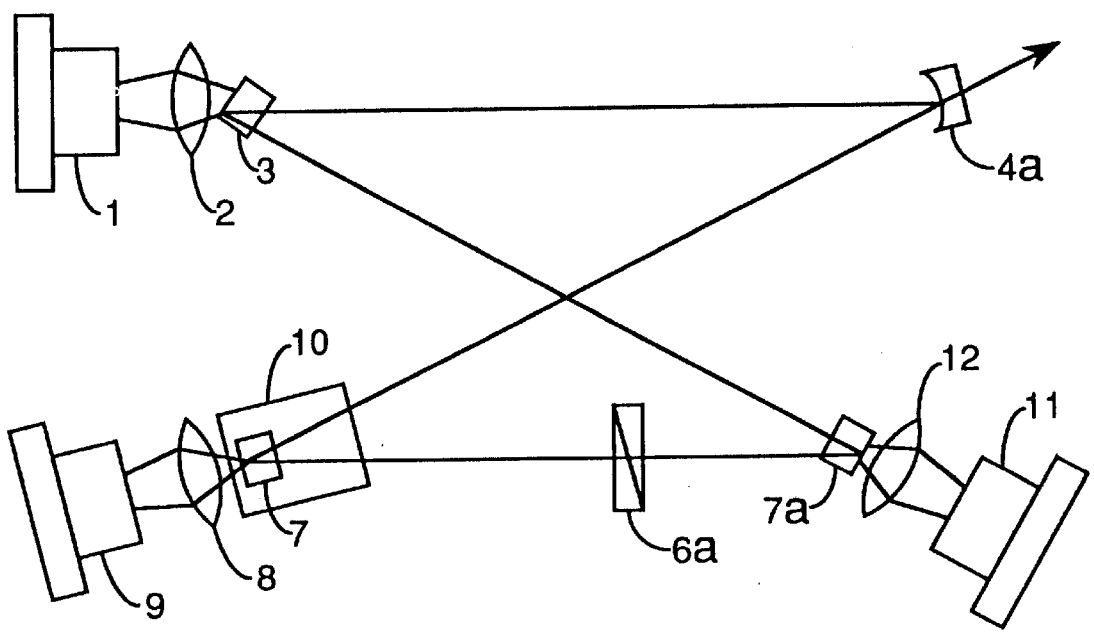
FIG. 7 is a schematic diagram of another ring resonator embodying the invention.

FIG. 6 depicts a ring-resonator like FIG. 5, but without the non-linear SHG crystal. In this case the outcoupling mirror 4a transmits a few percent for the fundamental frequency. Finally, in FIG. 7 a further design form of a ring shaped resonator is shown, based on the system shown in FIG. 6. Here mirror 4 is replaced by a third rod crystal 7a. A third laser diode 11 and corresponding optical system 12 are required in this case. Here also a non-linear SHG crystal can be used for frequency doubling.

In all of the above-mentioned resonators a Q-switch can be installed, so that pulsed operation is provided at high pulse power. A second harmonic SH is created by the non-linear SHG crystal 5, which is outcoupled, and modulation of the SH is avoided by means of the $\lambda/4$-plate (QWP6), which is located in the resonator.

Various lasing materials can be employed per the invention, e.g. laser crystals, including rare-earth-doped laser crystals and semi-conductor lasers (e.g. of GaAs doped with Indium) as well as wave-guide lasers.

The laser crystals employed per the invention, can take various exterior and cross-sectional shapes, e.g. angular, rounded or a combination thereof, including rectangular laser crystals and laser rod crystals, which are preferably in the present invention.

Also various means to pump each laser crystal can be employed herein, including a semi-conductor diode with coupling optics. And such laser crystals are preferably end-pumped per the present invention.

And various partial reflecting means can be employed herein including, mirrors, optical gratings, holograms and electro-optical devices.

What is claimed is:

1. A compact solid-state laser system having a resonator which is formed linearly, folded or ring-shaped comprising,
   a) at least two laser crystals mounted in optical opposition,
   b) means optically associated with each of said crystals to pump said crystals to generate a laser beam therebetween and
   c) partially reflective means, mounted optically between at least a pair of said crystals, for outcoupling a portion of said laser beam generated by said crystals and for resonating the remainder of said beam between said crystals.

2. The laser system of claim 1 wherein an SHG and a QWP are mounted optically between said partially reflective means and one of said crystals.

3. The laser system of claim 1 wherein each crystal is a rare-earth-doped laser rod crystal, said crystal being provided with a determinate radius of curvature on the side facing said coupling optics and coated HR for the fundamental frequency and AR for the pump light as well as AR for the fundamental frequency on another side of said crystal.

4. The laser system of claim 1 wherein said laser crystals serving as reflectors and amplification media, comprise Nd: YAG crystals or other rare-earth-doped laser materials.

5. The laser system of claim 1 wherein a KTP crystal is additionally positioned in the resonator for med by sa id crystals for doubling of the fundamental frequency (FF).

6. The laser system of claim 1 wherein a Q-switch is installed in the resonator formed by said laser crystals for pulsed operation.

7. The laser system of claim 1 wherein, in order to form a folded or ring resonator said laser crystals are arranged with one or more pivoting reflectors.

8. The laser system of claim 1 wherein a Faraday rotator and QWP are positioned in a ring resonator formed by said laser crystals and one or more pivoting reflectors.

9. The laser system of claim 1 wherein a ring resonator is formed by three laser rod crystals and at least one reflector.

10. The laser system of claim 1 wherein a 90° rotator, a Brewster-plate and Nd: YAG crystals, are added to said system to produce a pure $TEM_{00}$ laser beam.

11. The laser system of claim 2 wherein each crystal is a rare-earth-doped laser rod crystal, said crystal being provided with a determinate radius of curvature on the side facing said coupling optics and coated HR for the fundamental frequency and AR for the pump light as well as AR for the fundamental frequency on another side of said crystal.

12. The laser system of claim 2 wherein said laser crystals serving as reflectors and amplification media, comprise Nd: YAG crystals or other rare-earth-doped laser materials.

13. The laser system of claim 2 wherein a KTP crystal is additionally positioned in the resonator formed by said crystals for doubling of the fundamental frequency (FF).

14. The laser system of claim 2 wherein a Q-switch is installed in the resonator formed by said laser crystals for pulsed operation.

15. The laser system of claim 2 wherein, in order to form a folded or ring resonator said laser crystals are arranged with one or more pivoting reflectors.

16. The laser system of claim 2 wherein a Faraday rotator and QWP are positioned in a ring resonator formed by said laser crystals and one or more pivoting reflectors.

17. The laser system of claim 2 wherein a ring resonator is formed by three laser rod crystals and at least one reflector.

18. The laser system of claim 2 wherein a 90° rotator, a Brewster-plate and Nd: YAG crystals, are added to said system to produce a pure $TEM_{00}$ laser beam.

19. The laser system of claim 1 wherein said partial reflecting means is a mirror.

20. The laser system of claim 1 wherein said partial reflecting means is an optical grating.

21. The laser system of claim 1 wherein said partial reflecting means is a hologram.

22. The laser system of claim 1 wherein said partial reflecting means is an electro-optic.

23. The laser system of claim 1 wherein said crystals are laser rod crystals.

24. The laser system of claim 1 wherein said crystals are semiconductor lasers.

25. The laser system of claim 1 wherein said means to pump said crystals is a semiconductor diode with coupling optics, mounted proximate each of the crystals and matched therewith to provide longitudinal pumping with spatial overlap and to generate a laser beam in at least two of said crystals.

* * * * *